(No Model.)

W. W. REYNOLDS.
PLATFORM SCALE.

No. 249,994. Patented Nov. 22, 1881.

Attest:
Geo. H. Graham
T. H. Palmer

Inventor
Wm. W. Reynolds,
by Munson & Philipp
Attys.

UNITED STATES PATENT OFFICE.

WILLIAM W. REYNOLDS, OF RUTLAND, VERMONT, ASSIGNOR TO HOWE SCALE COMPANY, OF SAME PLACE.

PLATFORM-SCALES.

SPECIFICATION forming part of Letters Patent No. 249,994, dated November 22, 1881.

Application filed December 11, 1880. (No model.)

*To all whom it may concern:*

Be it known that I, WILLIAM W. REYNOLDS, a citizen of the United States, residing in the city of Rutland, county of Rutland, and State of Vermont, have invented certain new and useful Improvements in Scales, fully described and represented in the following specification and the accompanying drawings, forming a part of the same.

This invention relates to that class of scales that are constructed for use in large buildings, such, for instance, as those which are mounted for use in storehouses, elevators, and the like for the weighing of large quantities of grain and similar material, the bearings of which scales are frequently thrown out of level, and thus rendered inaccurate by the displacement of their supports caused by the settling of the building or its floors under the weight of material stored therein.

The present invention consists in a simple means for restoring the level of the bearings of such scales, and thus constantly maintaining the same in an accurate working condition, as will now be particularly described by the aid of the accompanying drawings, in which—

Figure 1:
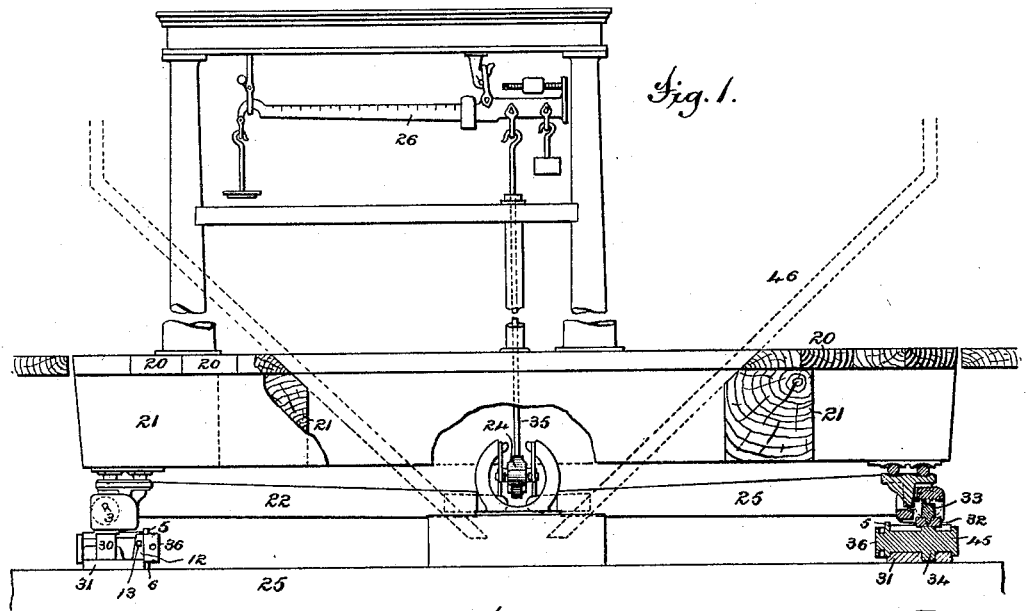
Figure 2:
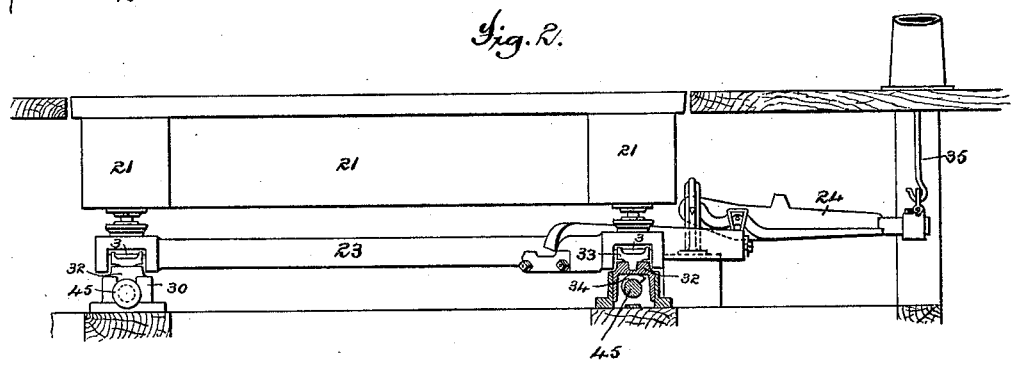
Figure 4:
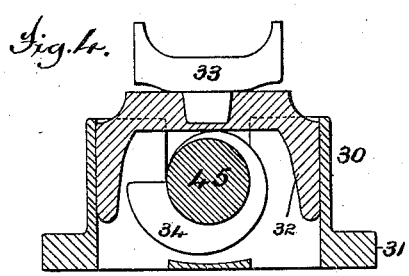
Figure 3:
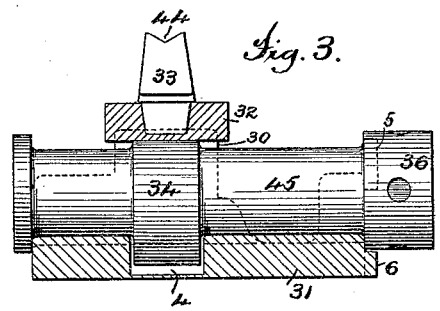
Figure 5:
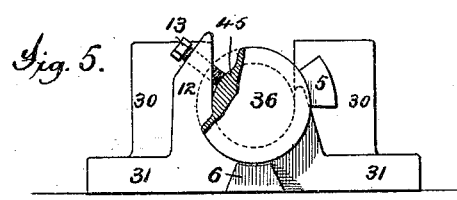

Figure 1 is a part sectional elevation of a platform-scale mounted for use. Fig. 2 is a similar view, showing another side of the apparatus. Fig. 3 shows a vertical elevation of one of the adjusting-cams; and Fig. 4 represents a cross-section, and Fig. 5 an end view, of the same.

The scale shown is of ordinary construction, for the reason that the invention is equally applicable to all forms of platform-scales. The one illustrated consists of an ordinary platform, in this instance composed of boards 20, supported upon a frame-work of beams, as 21, which platform is mounted, as is usual, upon a system of levers, as 22 23, the fulcrums of which rest upon stationary supports fixed to a flooring, as 25. The levers 22 23, at their inner ends, bear upon a lever, as 24, whereby their vibrating movements impart a reciprocation to a vertical draw-rod, as 35, that in turn operates upon the scale-beam 26.

No further description of the scale proper need be given, and it needs only to be remarked that the scale is of that character usually large in size that capacitates it to receive upon its platform 20 a vessel or vehicle adapted to contain a large bulk of material to be weighed. Thus it may receive a wagon or other load-containing vehicle or have combined with it a hopper, as 46, represented in Fig. 1 by dotted lines, which hopper, especially in granaries, may be fed by any material-conveying device. The invention in the present case will therefore be understood to relate wholly to the supports for the pivots of the levers of such a scale, which supports, it is manifest, must always be maintained in a relatively level position in order that the levers may properly functionate to enable the scale to perform a perfect weighing operation.

In granaries and other establishments where large bulks or quantities of material are stored and scales are provided to divide the same into measured quantities, it is a matter of common occurrence that the weight of such materials stored in the building causes the flooring to settle more or less, and this settling is never, or seldom, of equal degree throughout the flooring. Consequently it causes the scale supported in such a building to be thrown out of proper adjustment by having one or more of its pivot-supports deranged in its relative level position with the others. Many devices have been proposed to obviate this difficulty. Screws have been employed, and wedges used, but neither of these devices is effective or convenient in use. To attain the ready means for leveling each lever-support independently I provide each with a hollow pedestal, as 30, the bottom plate, 31, of which is attached to or rests upon the floor-beams of a building or other permanent support provided for the scale. Within this pedestal 30 a guide-block, 32, is arranged to move vertically, it being guided therein by the rising sides of the pedestal; and in a socket in the upper end of this guide-block I fit a saddle, 33, having an angular seat, as 44, which provides a proper rest for the knife-edged pivots 3 of the levers to rest in. The guide-block rests normally upon the surface of a cam, 34, which is fixed upon a short carrying-arbor, 45, that is seated in bearings provided for it in the hollow pedestal 30, said arbor being thus capable of a rotative movement in its seat. The cam 34 is enabled to turn without being raised by contact with the pedestal by the provision in the latter of a pocket, as 4. This cam bears against the under surface of the guide-block 32, and will, it is obvious, when properly turned, as it may be, by means of a wrench, turn-rod, or other appliance adapted to operate upon its head 36, raise or lower the guide-block 32, and with it the saddle 33, which governs the position of the pivots 3 of the lever it supports, so that one lever-support may be adjusted in its relation with the others, and all maintained in a level position.

In order that each support may be maintained in its adjustment against any jarring action of the building or floor or the platform of the scale itself, it is necessary to secure the arbor 45 in any position to which it may have been turned in moving the cam 34 to raise or lower the block 32, saddle 33, and the pivot supported thereby. This I accomplish by providing one side wall of the pedestal 30 or bracket 12 rising therefrom with a set-screw, 13, tapped through it and arranged to bear upon the arbor 45, which screw will set said arbor in any position, and consequently fixedly secure the cam 34; and to prevent the guide-block from passing off from the high part of the cam 34, where it is not given the eccentric form, and thus suddenly drop the lever-supports, I provide the head 36 of the arbor 45, carrying the cam 34, with a projecting stud, 5, arranged to engage with a stop, 6, fast on the plate 31, and thus arrest the rotation of the arbor and cam at a proper point of safety.

What is claimed is—

1. A weighing-scale the mounting-levers whereof, as 22 23, are sustained by independently-adjustable supports constituted by cams, as 34, substantially as described.

2. The combination, with the mounting-levers, as 22 23, of a weighing-scale, of a guide-block, as 32, a supporting-pedestal, as 30, a cam, as 34, and means for moving said cam, substantially as described.

3. The combination of the block 32, pedestal 30, cam 34, arbor 45, stud 5, and stop 6, substantially as described.

4. The combination of the block 32, pedestal 30, cam 34, arbor 45, and set-screw 13, substantially as described.

In testimony whereof I have hereunto set my hand in the presence of two subscribing witnesses.

WM. W. REYNOLDS.

Witnesses:
S. W. ROWELL,
I. C. PEASE.